United States Patent Office 3,293,122
Patented Dec. 20, 1966

3,293,122
PESTICIDAL COMPOSITION CONTAINING O,O-DI-
METHYL - O - (3 - METHYL - 4 - NITROPHENYL)
PHOSPHOROTHIOATE AND O,O-DIMETHYL-O-
(2,2-DICHLOROVINYL)PHOSPHATE
Shinichi Suzuki, Sakai-shi, and Saichiro Kuramoto, Toyo-
naka-shi, Japan, assignors to Sumitomo Chemical Com-
pany, Ltd., Osaka, Japan, a corporation of Japan
No Drawing. Filed Dec. 11, 1964, Ser. No. 417,779
Claims priority, application Japan, Dec. 26, 1963,
38/70,597
3 Claims. (Cl. 167—22)

The present invention relates to pesticidal composi-
tions containing, as the essential active ingredient, a
mixture of O,O-dimethyl-O-(3-methyl - 4 - nitrophenyl)
phosphorothioate and O,O-dimethyl-O-(2,2 - dichloro-
vinyl) phosphate. More particularly, it relates to
pesticidal compositions prepared by admixing O,O-di-
methyl - O - (3 - methyl - 4 - nitrophenyl) phosphoro-
thioate, O,O-dimethyl-O-(2,2-dichlorovinyl) phosphate
and at least one carrier of terpene oil and pine oil. An
object of the present invention is in the provision of
novel pesticidal compositions with low cost which pos-
sess decreased toxicity towards plants, especially towards
cruciferous plants, with increased pesticidal activity.
Other objects would be apparent from the following de-
scriptions.

The O,O-dimethyl-O-(3-methyl-4-nitrophenyl) phos-
phorothioate is a compound having extremely low-
toxicity towards warm blooded animals and having ex-
tensive effectiveness and strong pesticidal activities, and
is widely utilized. However, this compound is com-
paratively toxic to vegetables and fruit trees, and is es-
pecially toxic to cruciferous plants. Accordingly, this
compound has the disadvantage that it can not be used
in the cruciferous plants in spite of the strong pesticidal
activities towards injurious pests of the cruciferous plants
such as common cabbage worm (*Pieris rapae*), cabbage
army worm (*Barathra brassicae*), and clay backed cut-
worm.

The present pesticidal composition is less toxic towards
above described plants and has excellent pesticidal activi-
ties.

After wide researches, the present inventors have
found that the composition prepared by admixing about
equivalent amount of O,O-dimethyl-O-(2,2-dichlorovinyl)
phosphate and O,O-dimethyl-O-(3-methyl-4-nitrophenyl)
phosphorothioate and 40–85% by weight of terpene oil
or pine oil based upon the weight of the above mixture
of O,O-dimethyl-O-(2,2-dichlorovinyl) phosphate and
O,O - dimethyl - O - (3 - methyl - 4 - nitrophenyl) phos-
phorothioate, is not only capable of decreasing the above
described chemical harm of O,O-dimethyl-O-(3-methyl-
4-nitrophenyl) phosphorothioate to the vegetables and
fruit trees especially to the cruciferous plants, and also
have extremely high pesticidal activities by a synergistic
effect as compared with the activities of each component
alone.

It is preferred that the mixing proportion of O,O-
dimethyl - O - (3 - methyl - 4 - nitrophenyl) phosphoro-
thioate to O,O-dimethyl-O-(2,2-dichlorovinyl) phosphate
is about 1:1.

As to the mixing amount of the terpene or pine oil,
the amount of 10–100 weight percent, especially 40–85
weight percent is preferred, based upon the weight of
the mixture of O,O-dimethyl-O-(3-methyl-4-nitrophenyl)
phosphorothioate and O,O-dimethyl-O-(2,2-dichlorovinyl)
phosphate.

When this mixture is obtained as an emulsion, it is
necessary to add an assistant agent such as xylene and
emulsifier. As the emulsifier, an anionic or a nonionic
surface active agent or mixture of them may be em-
ployed.

The mixing order of the present composition is most
preferably conducted as shown in the examples.

The present composition is extremely advantageous in
the view point of cost in that a part of expensive O,O-
dimethyl-O-(3-methyl-4-nitrophenyl) phosphorothioate is
replaced by cheap O,O-dimethyl-O-(2,2-dichlorovinyl)
phosphate, and that the high pesticidal activities can be
exhibited without lowering pesticidal activities even in
an extremely lower concentration than the case of using
O,O - dimethyl - O - (3 - methyl - 4 - nitrophenyl) phos-
phorothioate alone, and also the chemical harm to the
cruciferous plants and the like can be decreased. This
fact has not yet been described in the literature.

The following examples are given merely by way of
illustration and not by way of limitation.

*Example 1*

The first emulsifiable concentrate prepared by mixing
25 g. of O,O-dimethyl-O-(3-methyl-4-nitrophenyl) phos-
phorothioate, 22. g. of xylene and 4 g. of a surface ac-
tive agent, Agrisol PA (a registered trade name of Kao
Soap K.K.) and the second emulsifiable concentrate pre-
pared by mixing 25 g. of O,O-dimethyl-O-(2,2-dichloro-
vinyl) phosphate, 21 g. of pine oil and 3 g. of the same
surface active agent, are blended together and agitated
vigorously. The thus-prepared emulsifiable concentrate
is diluted 1,000–2,000 times with water and applied to
a cruciferous plant. The emulsion shows excellent
pesticidal activity to the injurious insect of the plant
without chemical harm.

*Example 2*

The first emulsifiable concentrate prepared by mixing
20 g. of O,O-dimethyl-O-(3-methyl-4-nitrophenyl) phos-
phorothioate, 22. g. of xylene and 10 g. of a surface
active agent Argisol PA (a registered trade name of
Kao Soap K.K.), and the second emulsifiable concen-
trate prepared by mixing 20 g. of O,O-dimethyl-O-(2,2-
dichlorovinyl) phosphate, 21 g. of pine oil and 7 g. of
the same surface active agent, are blended together and
agitated vigorously. The thus-prepared emulsifiable con-
centrate is diluted 800–1,600 times with water and ap-
plied to a cruciferous plant. The emulsion shows excel-
lent pesticidal activity to the injurious insect of the
plant without chemical harm.

*Example 3*

The first emulsifiable concentrate prepared by mixing
25 g. of O,O-dimethyl-O-(3-methyl-4-nitrophenyl) phos-
phorothioate, and 3.5 g. of a surface active agent Emul-
gator W (a registered trade name of Bayer A.G.), and
the second emulsifiable concentrate prepared by mix-
ing 25 g. of O,O-dimethyl-O-(2,2-dichlorovinyl) phos-
phate, 43 g. of pine oil and 3.5 g. of the same surface
active agent are blended together and agitated vigorously.
The thus-prepared emulsifiable concentrate is diluted
1,000–2,000 times with water and applied to a cruciferous
plant. The emulsion shows excellent pesticidal activity
to the injurious insect of the plant without chemical
harm.

Example 4

The chemical harms to the cruciferous plants are as follows.

TABLE I

| Name of plant | Composition | Rate of dilution | | |
|---|---|---|---|---|
| | | ×500 | ×1000 | ×2000 |
| Cabbage | A composition prepared in Example 1. | − | − | − |
| | A composition prepared in Example 2. | − | − | − |
| | A composition prepared in Example 3. | − | − | − |
| | A 50% emulsifiable concentrate of O,O-dimethyl-O-(3-methyl-4-nitrophenyl) phosphorothioate. | ++ | + | − |
| Radish | A composition prepared in Example 1. | − | − | − |
| | A composition prepared in Example 2. | − | − | − |
| | A composition prepared in Example 3. | − | − | − |
| | A 50% emulsifiable concentrate of O,O-dimethyl-O-(3-methyl-4-nitrophenyl) phosphorothioate. | + | + | − |
| Komatsuna (A kind of Chinese cabbage). | A composition prepared in Example 1. | ± | − | − |
| | A composition prepared in Example 2. | − | − | − |
| | A composition prepared in Example 3. | − | − | − |
| | A 50% emulsifiable concentrate of O,O-dimethyl-O-(3-methyl-4-nitrophenyl) phosphorothioate. | +++ | ++ | + |

Note: The test plants were at the stage of two true leaves which have been sown so as to grow 10 plants in a 15 cm. pot.

The each composition diluted to the fixed concentration was sprayed in an amount of 10 cc. per pot.

In the above Table I. "−" shows harmlessness and "+" shows harmfulness. As the number of "+" increases, the chemical harmfulness is large. "±" shows to be almost harmless.

Example 5

The synergistic effect of pesticidal activity against clay backed cutworm is shown below, comparing with each activity of the component O,O-dimethyl-O-(3-methyl-4-nitrophenyl) phosphorothioate along and the component, O,O-dimethyl-O-(2,2-dichlorovinyl) phosphate alone.

TABLE II

| Composition | Pesticidal activity against 2d instar larvae of clay backed cutworm (percent) | | | |
|---|---|---|---|---|
| | Rate of dilution | | | |
| | ×1000 | ×2000 | ×4000 | ×8000 |
| A composition prepared in Example 1 | 100 | 100 | 80 | 40 |
| A 50% emulsifiable concentrate of O,O-dimethyl-O-(3-methyl-4-nitrophenyl) phosphorothioate | 95 | 80 | 50 | 20 |
| O,O-dimethyl-O-(2,2-dichlorovinyl) phosphate | 90 | 60 | 20 | 0 |

What we claim is:

1. A pesticidal composition comprising a carrier, and as the essential active ingredient, an approximately 1:1 mixture by weight of O,O-dimethyl-O-(3-methyl-4-nitrophenyl) phosphorothioate and O,O-dimethyl-O-(2,2-dichlorovinyl) phosphate.

2. A pesticidal composition comprising as the essential active ingredient, an approximately 1:1 mixture by weight of O,O-dimethyl-O-(3-methyl-4-nitrophenyl) phosphorothioate and O,O-dimethyl-O-(2,2-dichlorovinyl) phosphate, and about 10 to 100 weight percent, based on the weight of said mixture of at least one member selected from the group consisting of terpene oil and pine oil.

3. A method for combating insects which attack cruciferous plants which comprises applying to said plants an insecticial amount of an approximately 1:1 mixture by weight of O,O-dimethyl-O-(3-methyl-4-nitrophenyl) phosphorothioate and O,O-dimethyl-O-(2,2-dichlorovinyl) phosphate.

References Cited by the Examiner

UNITED STATES PATENTS 3,091,565  5/1963  Suzuki _____ 167—30
3,116,201  12/1963  Whetstone _____ 167—22

OTHER REFERENCES

Frear: Chemistry of Pesticides, third edition, D. Van Nostrand Company, Inc., New York, 1955, page 418.

JULIAN S. LEVITT, *Primary Examiner.*

JEROME D. GOLDBERG, *Assistant Examiner.*